United States Patent
Schneider

(10) Patent No.: US 6,325,470 B1
(45) Date of Patent: Dec. 4, 2001

(54) METHOD AND APPARATUS FOR PROPORTIONING REGENERATIVE BRAKING

(75) Inventor: Michael John Schneider, Bloomfield Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 08/942,042

(22) Filed: Oct. 1, 1997

(51) Int. Cl.[7] ........................................... B60T 8/64
(52) U.S. Cl. ............................................ 303/152; 303/186
(58) Field of Search .................... 303/152, 186, 303/187, 188, 189, DIG. 1, DIG. 2, DIG. 6, 3, 15, 20; 188/156, 159, 181 T

(56) References Cited

U.S. PATENT DOCUMENTS

| | | | |
|---|---|---|---|
| 4,962,969 | 10/1990 | Davis | 303/3 |
| 5,253,929 | 10/1993 | Ohori | 303/3 |
| 5,326,158 | 7/1994 | Ohori et al. | 303/3 |
| 5,326,160 * | 7/1994 | Bayliss et al. | 303/113.2 |
| 5,378,053 * | 1/1995 | Patient et al. | 303/3 |
| 5,421,643 | 6/1995 | Kircher et al. | 303/3 |
| 5,450,324 | 9/1995 | Cikanek | 303/3 |
| 5,492,192 * | 2/1996 | Brooks et al. | 303/3 |
| 5,505,527 | 4/1996 | Gray, Jr. et al. | 303/152 |
| 5,511,859 | 4/1996 | Kade et al. | 303/152 |
| 5,568,962 | 10/1996 | Enomoto et al. | 303/152 |
| 5,573,312 | 11/1996 | Müller et al. | 303/3 |
| 5,615,933 | 4/1997 | Kidston et al. | 303/152 |
| 5,707,115 * | 1/1998 | Bodie et al. | 303/3 |

OTHER PUBLICATIONS

Article, "Electronic Brake Force Distribution Control—A Sophisticated Addition to ABS", Gunther Buschmann, Hans-Thomas Ebner, and Weiland Kuhn.

* cited by examiner

Primary Examiner—Robert J. Oberleitner
Assistant Examiner—Thomas J. Williams
(74) Attorney, Agent, or Firm—John E. Kajander

(57) ABSTRACT

A method and apparatus for providing regenerative and friction braking on a vehicle having one or more wheels driven by a drive motor includes a master cylinder (28), a hydraulic control unit (30), a brake control unit (38), a drive motor control unit (52) and a drive motor (18). The drive motor control unit determines a coast down regenerative torque signal and a driver brake command regenerative torque signal and commands the drive motor to regeneratively brake the driven left and right wheels in response to whichever of the coast down regenerative torque signal and the driver brake command regenerative torque signal is greatest, thereby maintaining a desirable proportioning of front to rear braking.

11 Claims, 4 Drawing Sheets

METHOD AND APPARATUS FOR PROPORTIONING REGENERATIVE BRAKING

BACKGROUND OF THE INVENTION

1. Field of the Invention

This application is related to co-pending applications, entitled "METHOD AND APPARATUS FOR REGENERATIVE AND FRICTION BRAKING", "METHOD AND APPARATUS FOR REGENERATIVE AND FRICTION BRAKING" and "METHOD AND APPARATUS FOR REGENERATIVE AND ANTI-SKID FRICTION BRAKING", respectively, all filed on Sep. 30, 1997 and assigned to the assignee of the present application.

This invention relates generally to a method and apparatus for regenerative and friction braking of a motor vehicle having an electric drive motor. More particularly, the present invention relates to proportioning regenerative braking to maintain a desirable front to rear brake distribution.

2. Disclosure Information

The general principle of regenerative braking has been recognized by manufacturers of electric vehicles as a way of increasing the overall efficiency of the vehicle. Regenerative braking seeks to recover as much of the kinetic energy of the vehicle which is normally dissipated as heat through a normal hydraulic friction system by operating the electric motor drive as a generator and restoring the generated electricity to a battery or other energy storage device. Various methods have been proposed for accomplishing regenerative braking in such electric vehicles, however, these regenerative systems generally require additional hardware above and beyond that normally associated with a hydraulic braking system. Further, it has been observed that some regenerative braking systems do not provide desirable proportioning of the front and rear braking torques.

It would therefore be advantageous to provide a proportional regenerative braking system capable of proportioning the regenerative brake torque to maintain a desirable front to rear brake distribution.

SUMMARY OF THE INVENTION

Accordingly, the present invention provides a method and apparatus for providing regenerative and friction braking on a vehicle having one or more wheels driven by a drive motor utilizing hardware from a conventional anti-skid hydraulic friction braking system. The regenerative and friction braking apparatus includes a master cylinder for generating a hydraulic signal in response to a driver brake command and a pressure sensor for generating a pressure signal representative of the hydraulic signal. A throttle sensor is also included for generating an acceleration signal in response to a driver acceleration command.

The apparatus also includes an undriven left wheel having a first brake actuator and a first speed sensor operatively associated therewith for generating an undriven left wheel speed signal as well as an undriven right wheel having a second brake actuator and a second speed sensor operatively associated therewith for generating an undriven right wheel speed signal. Additionally, driven left and right wheels connect to the drive motor and include third and fourth brake actuators and third and fourth speed sensors operatively associated therewith for generating driven left and right wheel speed signals.

A hydraulic control unit is provided and is in fluid communication with hydraulic signal from the master cylinder. The hydraulic control unit also communicates with the first, second, third and fourth brake actuators, respectively.

The apparatus further includes a power storage device in communication with the drive motor. A brake controller is provided for commanding the hydraulic control unit in response to the pressure signal and the driven and undriven left and right wheel speed signals.

A drive motor controller is included for determining a coast down regenerative torque signal and a driver brake command regenerative torque signal and commanding the drive motor to regeneratively brake the driven left and right wheels in response to whichever of the coast down regenerative torque signal and the driver brake command regenerative torque signal is greatest, thereby maintaining a desirable proportioning of front to rear braking.

The method of operating the regenerative and friction braking apparatus for the vehicle comprises the steps of:

generating a hydraulic signal in response to a driver brake command as applied to a master cylinder;

producing a pressure signal representative of the hydraulic signal;

producing an acceleration signal in response to a driver acceleration command;

determining a coast down regenerative torque signal from the accelerator signal;

determining a driver brake command regenerative torque signal in response to said pressure signal; and commanding the drive motor to regeneratively brake the driven left and right wheels in response to whichever of the coast down regenerative torque signal and the driver brake command regenerative torque signal is greatest, thereby maintaining a desirable proportioning of front to rear braking.

Advantageously, the method and apparatus for providing regenerative and friction braking efficiently recovers the kinetic energy normally lost through heat generation and dissipation resulting from the use of conventional hydraulic brake systems while maintaining a desirable proportioning of front to rear braking torques.

DETAILED DESCRIPTION OF THE PREFERRED EMBODIMENT

Figure 1:
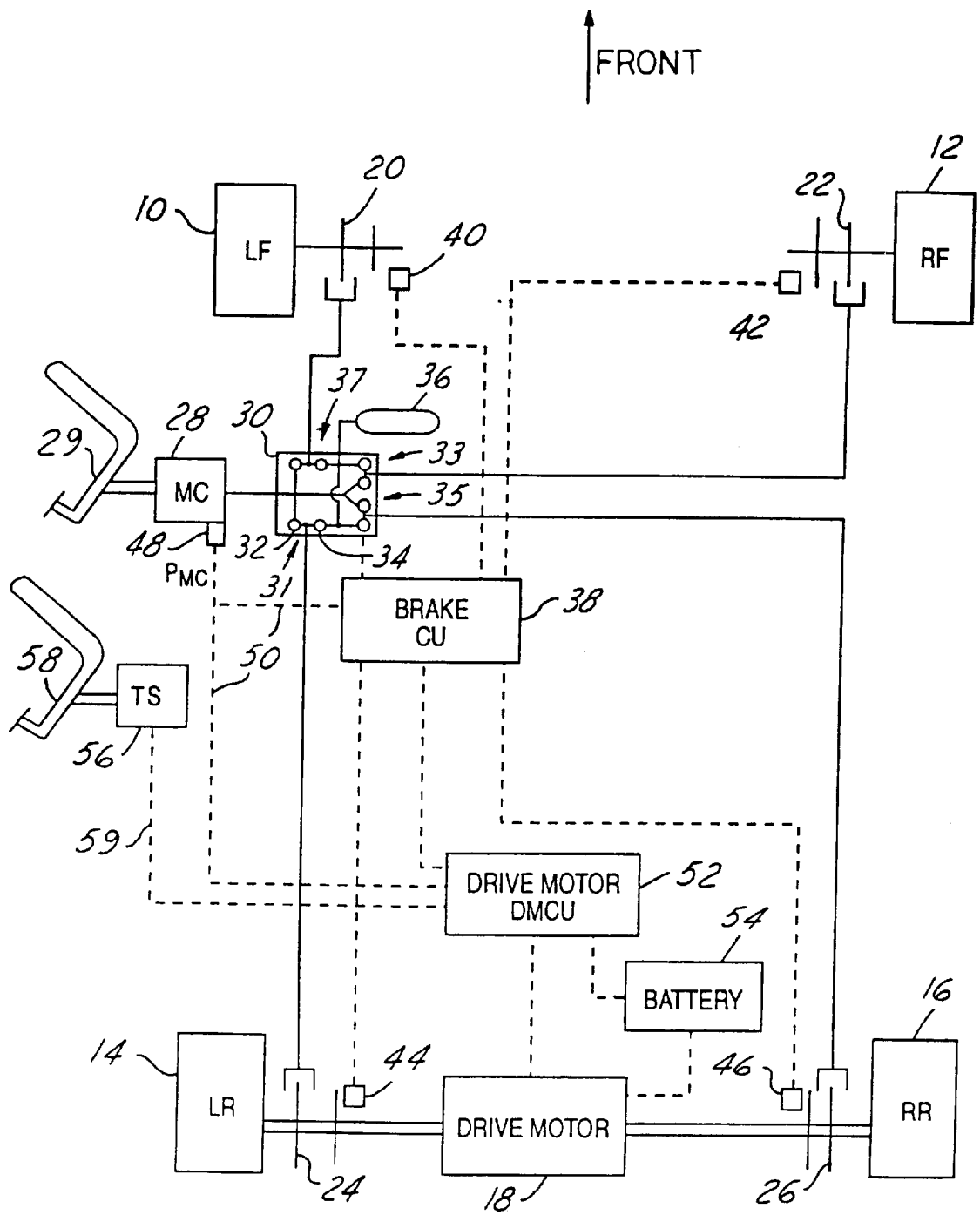
FIG. 1 is a schematic illustration of a motor vehicle incorporating a method and apparatus for regenerative and friction braking in accordance with the present invention.

Referring now to FIG. 1, the example vehicle braking system illustrated includes left and right front wheel 10 and 12 and left and right rear wheels 14 and 16 driven by an electric drive motor 18. The front and rear wheel 10, 12, 14 and 16 have respective hydraulic brakes 20, 22, 24 and 26 actuated by hydraulic pressure generated by a master cylinder 28 in response to an operators brake demand generated through a brake pedal 29. The brake actuators 20, 22, 24 and 26 are hydraulically coupled to the master cylinder 28 by hydraulic control unit 30.

The hydraulic control unit 30 includes four pairs of valves, 31, 33, 35 and 37, each pair having a build valve 32 and a dump valve 34 (for each brake actuator) and a hydraulic pump (not shown). The inlet side of the build valve is hydraulically connected to the master cylinder and the outlet side of the build valve communicates hydraulic fluid to the associated dump valve and its associated brake actuator. The dump valve 34 communicates hydraulic fluid to a brake fluid accumulator 36. The build and dump valve pairs operate in manner similar to build and dump valves found on conventional anti-skid systems, permitting the hydraulic pressure at the individual brake actuators to be regulated. Using the master cylinder as the input, this pressure can range from zero up to the full pressure of the master cylinder.

The build valve 32 and dump valve 34 are of the electromagnetic valve configuration and receive their control signal from a brake control unit (BCU) 38. The BCU uses data collected from left and right front wheel speed sensors 40, 42 and left and right rear wheel speed sensors 44, 46 and a pressure sensor 48 associated with the master cylinder for generating a master cylinder pressure signal 50. The BCU is also in communication with the drive motor control unit (DMCU) 52 and shares data therewith so that the rear wheels may cooperatively be regeneratively braked by the drive motor 18 in order to charge an energy storage device such as a battery 54. The DMCU is further in communication with a throttle sensor 56 which is operated by a conventional accelerator pedal 58 in response to the foot pressure applied by the vehicle operator.

The BCU 38 and the DMCU 52 cooperatively control the front and rear brakes 20, 22, 24 and 26 to establish a desired braking condition as requested by the driver and represented by the master cylinder pressure signal 50.

The control units 38, 52 each are microprocessor based devices including random access and read-only memories and appropriate input/output interface circuitry to receive the input signals and provide the command outputs as described and shown. Construction of suitable controllers is within the level of one skilled in the art.

Figure 2A:
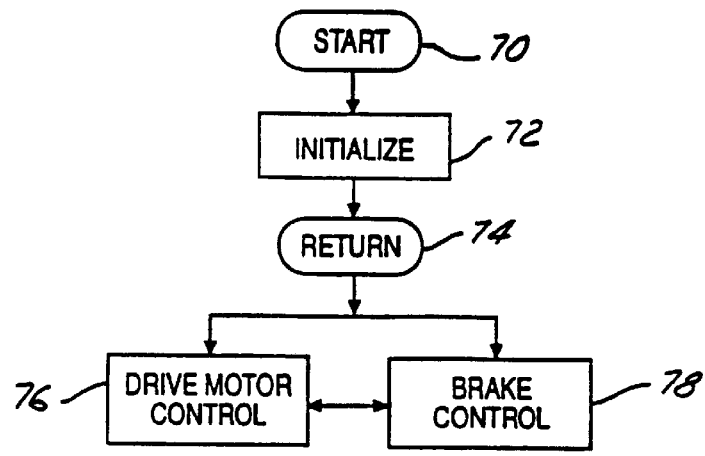
FIG. 2A is a high-level flow chart illustrating the interrelationship of the control of the motor and the brake system of a motor vehicle incorporating a method and apparatus for regenerative and friction braking in accordance with the present invention.

Referring now to FIG. 2A, in general the BCU and DMCU operate in tandem and share data. In the preferred embodiment, this exchange of data occurs via a multiplex communication bus. In view of this, the operation of the DMCU will be described first and the operation of the BCU will be described thereafter with interdependencies being described where they occur. It should be recognized that the various steps being described are described in the illustrated sequence for convenience, it being understood that there is no specific order unless specifically mentioned. As a further note, those skilled in the art will recognize that the logic of the control systems illustrated and described may be implemented in a single controller, or as shown in two separate controller units.

As represented by the flow chart of FIG. 2A, the vehicle is started at block 70 and various system parameters are initialized at block 72 in each of the controllers. During operation, the drive motor control 76 and the brake control 78 will issue commands to return to the top of the flow chart at the return block 74.

Figure 2B:
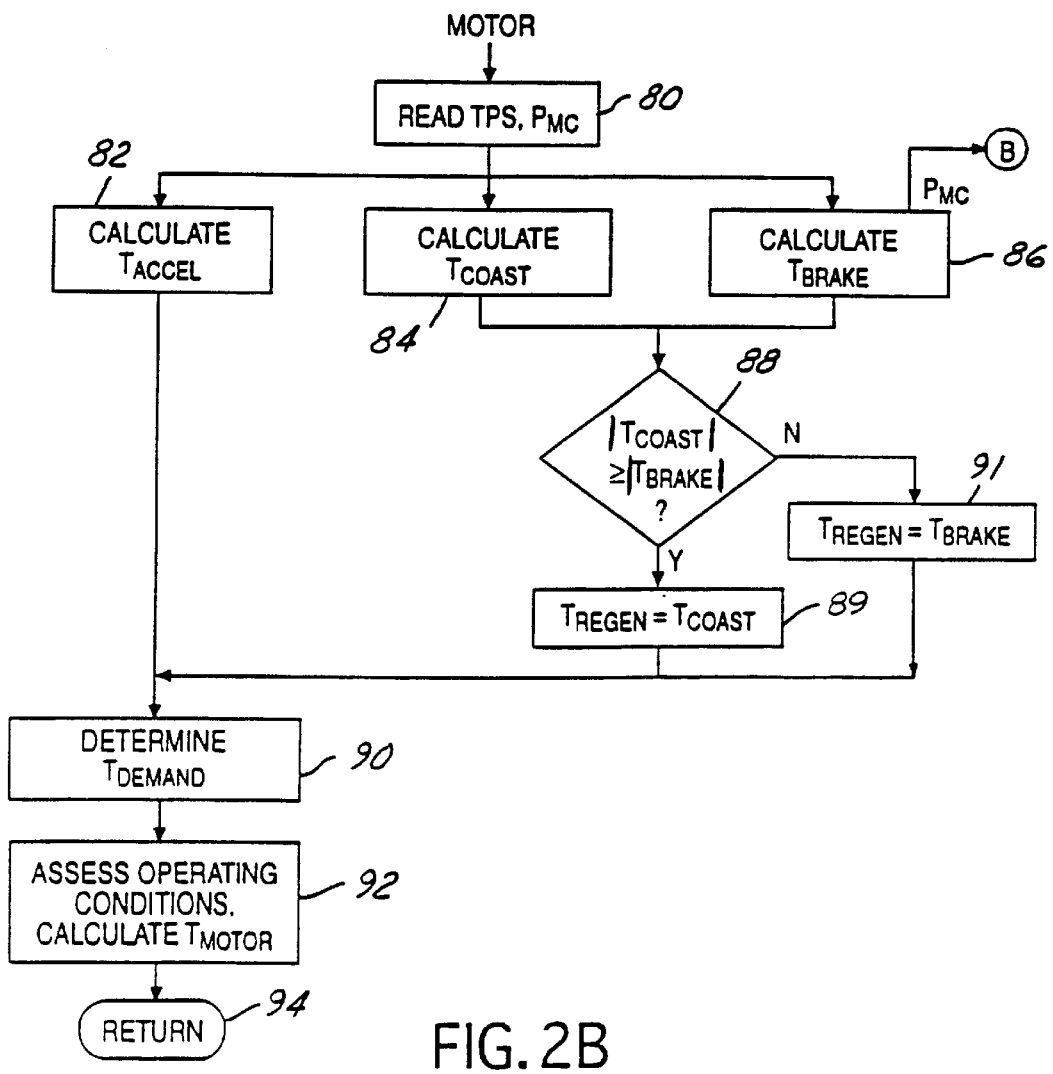
FIG. 2B is a flow chart illustrating motor control logic constructed in accordance with the present invention.

Referring now to FIGS. 2A & 2B, the DMCU 52 implements the drive motor control 76, which includes the steps represented by the flow chart shown. At block 80, the DMCU 52 senses acceleration command via the throttle position sensor 56, which provides an acceleration signal representing the displacement of the accelerator pedal 58 in response to a pressure applied to the accelerator pedal 58 by the operator. Similarly, the drive motor controller senses a braking command by sensing the master cylinder pressure which exists when the vehicle operator applies pressure to the brake pedal 29 at the pressure sensor 48.

At block 82, the DMCU 52, in response to the acceleration signal, determines an appropriate acceleration torque necessary to satisfy the acceleration command, $T_{ACCEL}$. At block 84, the DMCU determines whether coast down braking is required to stimulate the compression braking created by a part or closed throttle condition of an internal combustion engine. In a conventional manner, the motor controller evaluates the acceleration signal, the motor RPM and other vehicle operating parameters and determines an appropriate coast down torque, $T_{COAST}$. At block 86, the motor controller takes the pressure signal 50 generated by the pressure sensor 48 and determines an appropriate amount of braking torque to be generated by the drive motor, $T_{BRAKE}$. At block 88 the DMCU determines the maximum regenerative torque, $T_{REGEN}$, for regeneratively braking the driven wheels.

Figure 3:
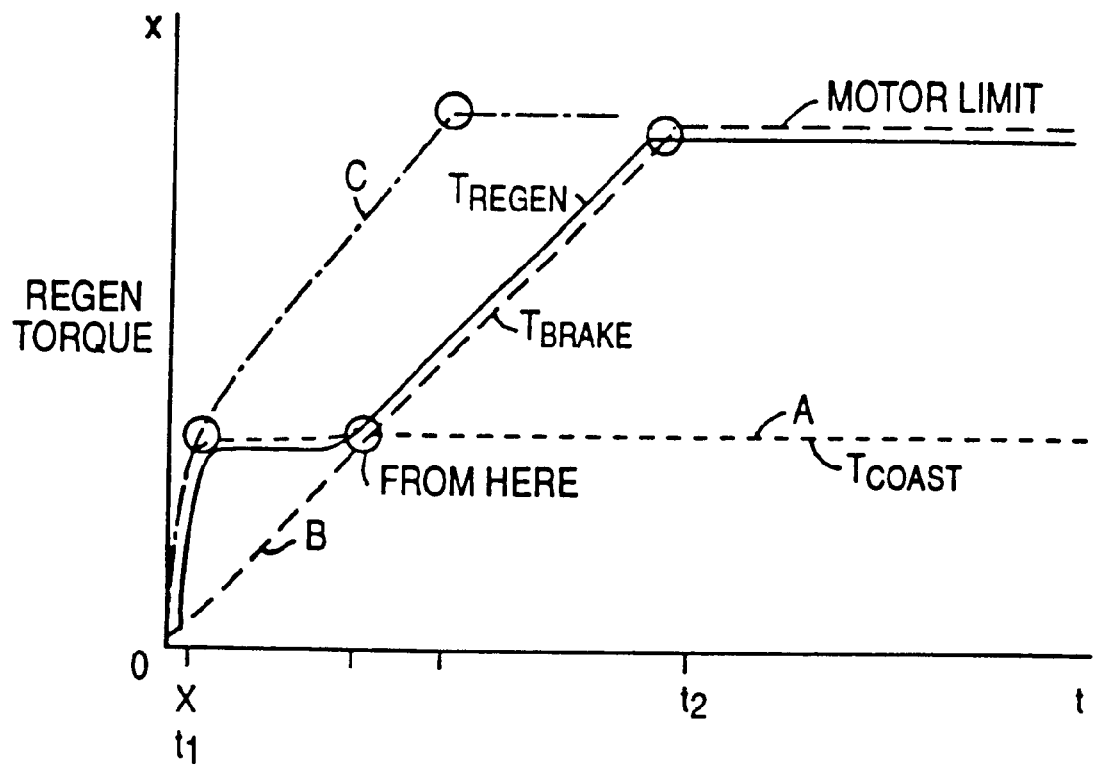
FIG. 3 is graph illustrating regenerative torque commanded by a drive motor control unit in accordance with the present invention.

Referring now to FIG. 3, the graph illustrates the regenerative torque commanded by the motor controller versus time. Line A represents the regenerative torque for a drive motor connected to a single speed transmission simulating the compression braking of an internal combustion engine operating under a restricted throttle condition, as indicated by the acceleration signal. Line B represents the driver commanded brake torque, $T_{BRAKE}$, that must be generated by the drive motor in accordance the master cylinder pressure signal. For instance, $T_{BRAKE}$ may be determined by simply multiplying the pressure signal by an empirically determined system constant, thereby providing a linear relationship between $T_{BRAKE}$ and the pressure signal. Alternatively, $T_{BRAKE}$, may be determined using a lookup table representing the ideal front to rear brake proportioning relationship for the given vehicle.

Conventional regenerative brake controllers add $T_{COAST}$ and $T_{BRAKE}$ to achieve maximum energy regeneration. The result of this is illustrated by Line C. It can be seen that the amount of regenerative braking from the time $t_1$ to $t_2$ may exceed the driver commanded brake torque indicated by the pressure signal. This may cause the driven wheels to be braked harder than the undriven wheels, possibly resulting in front to rear brake proportioning outside of the range of desired brake proportioning. This can be especially important in rear drive vehicles.

To avoid this, the present invention sets the regenerative braking force, $T_{REGEN}$, equal to whichever of the magnitude of $T_{COAST}$ or $T_{BRAKE}$ is the greatest, thus avoiding their addition during the time period between $t_1$ and $t_2$. Specifically, referring back to FIG. 2B, at block 88 the DMCU determines whether the magnitude of $T_{COAST}$ is greater than or equal to the magnitude of $T_{BRAKE}$. If the magnitude of $T_{COAST}$ is greater than or equal to the magnitude of $T_{BRAKE}$, the DMCU proceeds to block 89 where $T_{REGEN}$ is set equal to $T_{COAST}$. Providing full coast down deceleration for zero or light braking conditions when $T_{BRAKE}$ becomes greater then $T_{COAST}$, the DMCU proceeds to block 91 and sets $T_{REGEN}$ equal to $T_{BRAKE}$, thus ensuring a desirable proportioning relationship between front and rear braking forces.

At block 90, the motor controller determines the total torque demand, $T_{DEMAND}$, by summing $T_{ACCEL}$ and $T_{REGEN}$. At block 92, the DMCU accesses a variety of operating conditions to determine whether or not the drive motor 18 can be operated and whether the regenerative torque command, $T_{REGEN}$, exceeds predetermined limits of the drive motor.

Referring again to FIG. 3, the effect of the motor limit is illustrated. The limitations on the motor vary depending on the instant operating conditions. For instance, the DMCU may invoke power conserving modes if there is low voltage in the battery 54 to limit the energy available for acceleration or similarly if the battery is substantially charged, the DMCU may limit the regenerative torque. Another condition which may result in limited or no regenerative torque being created by the drive motor is if an ABS flag is set to indicate an ABS event, which will be described in greater detail below.

Referring back now to FIGS. 2A & 2B, after determining what limitations apply, the DMCU issues a motor torque signal, TMOTOR, to command the drive motor and returns via return block 94 to return block 74.

Figure 2C:
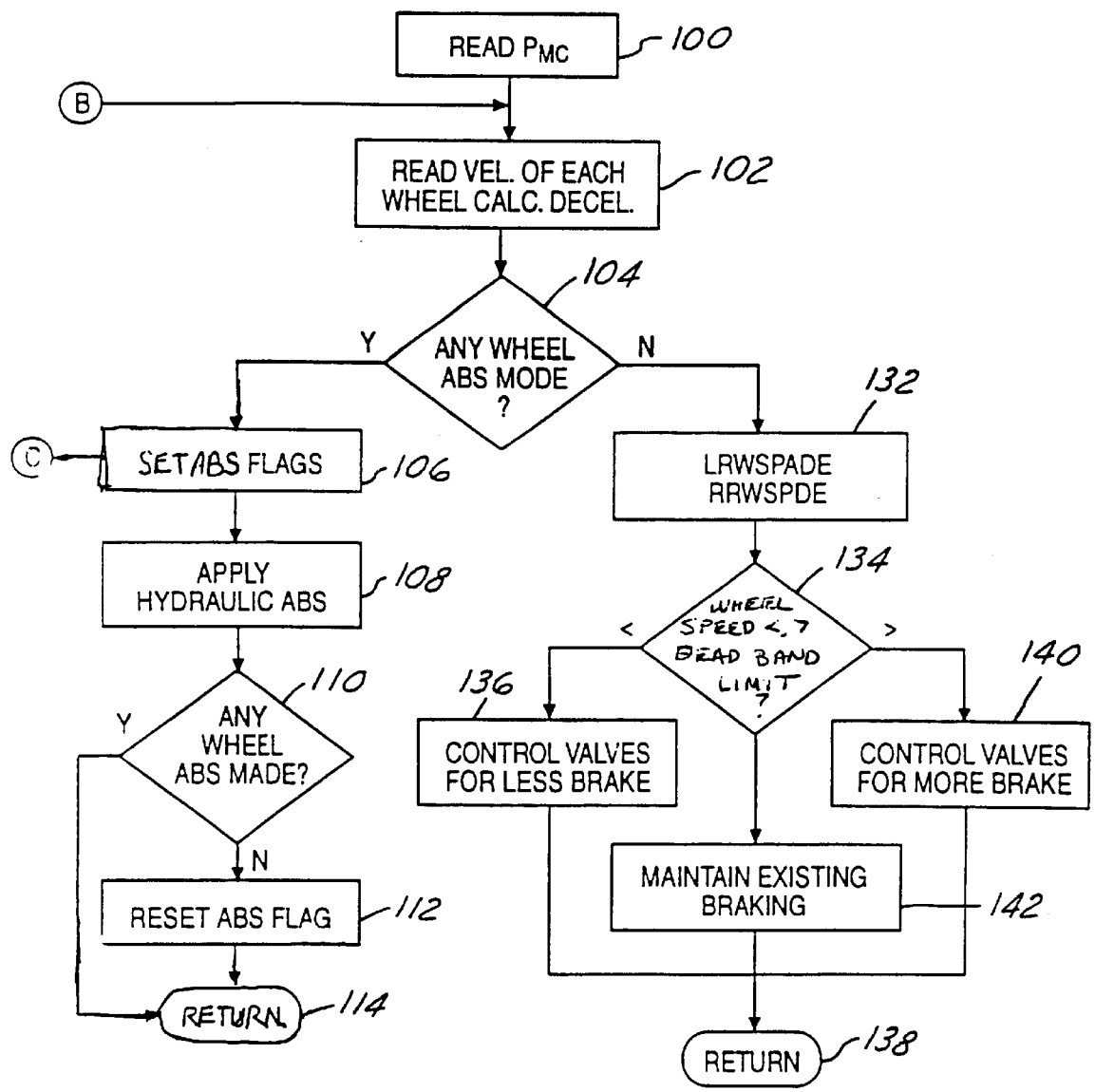
FIG. 2C is a flow chart illustrating brake control logic constructed in accordance with the present invention.

Referring now to FIGS. 2A & 2C, the BCU 38 implements the brake control 78, which includes the steps represented by the flow chart shown. At block 100 the BCU 38 reads the master cylinder pressure signal 50 as generated by the pressure sensor 48. BCU advances to block 102 where each of the wheel speeds sensors 40, 42, 44 and 46 are read. Using this data, the BCU estimates the vehicle velocity and calculates the deceleration of each wheel 10, 12, 14 and 16.

At block 104 the brake controller determines whether any of the four wheels are in an ABS mode. This determination may be made by comparing the deceleration rate of a given wheel and its instantaneous velocity to predetermined thresholds in a manner familiar to those skilled in the art of anti-skid braking control. If any one of the wheels is determined to require anti-skid control, the BCU enters ABS mode, and the controller advances to block 106 where an ABS flag is set to indicate the anti-skid control is engaged. This signal is communicated to the DMCU where, at block 92, regenerative braking is disabled or reduced in accordance with the abs mode entered.

At block 108, the BCU controls the brakes in accordance with known hydraulic anti-skid brake control. The BCU proceeds to 110 where the brake controller again determines whether or not the system continues to require anti skid control in the same manner as done at block 104. If the system is still in anti-skid control, the BCU proceeds to block 114. If, however, anti-skid control is no longer required based on the query in 110, the controller proceeds to block 112 where the ABS flag is reset and the brake controller returns to return block 74 via the return block 114.

If none of the wheels are in anti-skid braking control mode, the logic proceeds to block 132 wherein the left and right rear wheel speed signals are determined.

Figure 4:
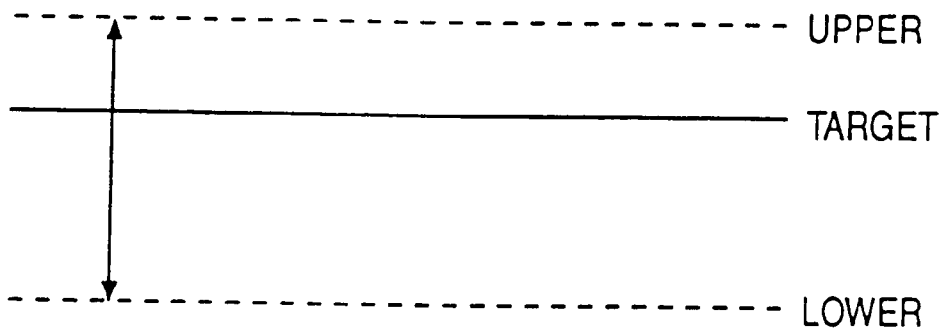
FIG. 4 is graph illustrating a deadband used by a controller of the present of the invention.

At block 134, the BCU evaluates the individual right and left rear wheel speed signals against a predetermined deadband. Referring to FIG. 4, a graph illustrating the relationship of upper and lower deadband limits set about a given target. The upper and lower deadbands may be found by adding and subtracting constant values to the target value or by adding and subtracting a predetermined percentage of the target value. The upper and lower deadband limits may or may not be equally spaced about the target. Depending on whether the wheel speeds are within the deadband or out determines the next operation of the BCU.

Referring back now to FIG. 2C, the BCU proceeds to block 136 if one of the wheel speeds is below the lower deadband limit, and the BCU commands the hydraulic control unit 30 to reduce the brake pressure for the actuator of that rear wheel.

The hydraulic control unit 30 accomplishes this by opening the dump valve 34 for the given brake actuator such that brake pressure in the line at the brake actuator can vent to the accumulator 36. The dump valve 34 may be operated via a pulse width modulated (pwm) signal generated by the BCU in proportion to the wheel speed error. The BCU proceeds via return block 138 to return block 74.

If one of the wheel speed signals is above the upper deadband limit, indicating the rear wheel speed is too high, the BCU proceeds to block 140 to open the build valves 32 and build pressure in the actuator of that wheel. In the preferred embodiment, this is done via a control signal sent from the BCU to the hydraulic control unit in the form of a pulse width modulated signal proportional to the wheel speed error. It should be recognized by those skilled in the art that the pulse width modulated signal used for controlling the build and dump valves can be derived using proportional, integral and derivative control schemes as well as any other method. The BCU returns to block 74 via return block 138.

If the wheel speed is within the deadband, the BCU takes no action, thus maintaining the existing brake pressures and passing through block 142 to return block 74 via return block 138.

Therefore, under normal braking the regenerative brake system of the present invention operates by first having the DMCU command the drive motor to generate a regenerative braking torque, $T_{REGEN}$ and the BCU closes the build valve to cut off brake pressure to the rear actuators, Thereafter, the hydraulic brake system supplements this braking to the extent necessary to achieve desired front to rear proportioning of the overall braking forces generated during braking events that do not invoke anti-skid control. The desired front to rear brake proportioning is achieved by controlling the individual rear wheel speeds to be approximately equal to the wheel speed of the corresponding front wheel. The result of this control scheme is the generation of maximum regenerative braking from the driven rear wheels while maintaining a predetermined level of front to rear proportioning that is supplemented with hydraulic braking only when the braking demand exceeds the regenerative braking capacity of the drive motor. Any supplemental hydraulic braking is proportioned according to the wheel speeds which are representative of wheel slip.

The foregoing description presents a preferred embodiment of the present invention. Details of construction have been shown and described for purposes of illustration rather than limitation. For instance, it could be advantageous to use a single valve for controlling the hydraulic pressure applied to brake actuators for the driven wheels of the vehicle, thus reducing complexity and cost over a system having both a build and a dump valves. Additionally, the present invention could be applied to vehicles having the driven wheels located at either the front or rear of the vehicle. Other modifications and alterations of the invention will no doubt occur to those skilled in the art that will come within the scope and spirit of the following claims:

I claim:

1. A regenerative and friction braking apparatus for a vehicle having one or more wheels driven by a drive motor, comprising:

a master cylinder for generating a hydraulic signal in response to a driver brake command;

a pressure sensor for generating a pressure signal representative of said hydraulic signal;

a throttle sensor for generating an acceleration signal in response to a driver acceleration command;

an undriven wheel having a first brake actuator;

a driven wheel connected to the drive motor and having a third brake actuator;

a hydraulic control unit in fluid communication with said master cylinder and said first and third brake actuators;

a power storage device in communication with the drive motor;

brake control means for commanding said hydraulic control unit in response to said pressure signal; and drive motor control means for determining a coast down regenerative torque signal and a driver brake command regenerative torque signal and commanding the drive motor to regeneratively brake said driven wheel in response to whichever of said coast down regenerative torque signal and said driver brake command regenerative torque signal is greatest, thereby maintaining a desirable proportioning of front to rear braking.

2. A regenerative and friction braking apparatus according to claim 1, wherein said coast down regenerative torque signal is determined using said acceleration signal.

3. A regenerative and friction braking apparatus according to claim 1, wherein said driver brake command regenerative torque signal is determined using said pressure signal.

4. A regenerative and friction braking apparatus according to claim 1, wherein said driver brake command regenerative torque signal is equal to the product of the pressure signal and an empirically determined system constant.

5. A regenerative and friction braking apparatus according to claim 1, wherein said drive motor control means selectively reduces said regenerative braking in response to predetermined system conditions and said brake control means increases said hydraulic braking by said third hydraulic actuator, so as to maintain said desirable proportioning of front to rear braking.

6. A regenerative and friction braking apparatus for a vehicle having one or more wheels driven by a drive motor, comprising:

a master cylinder for generating a hydraulic signal in response to a driver brake command;

a pressure sensor for generating a pressure signal representative of said hydraulic signal;

a throttle sensor for generating an acceleration signal in response to a driver acceleration command;

an undriven left wheel having a first brake actuator and a first speed sensor operatively associated therewith;

an undriven right wheel having a second brake actuator and a second speed sensor operatively associated therewith;

a driven left wheel connected to the drive motor and having a third brake actuator and a third speed sensor operatively associated therewith;

a driven right wheel connected to the drive motor and having a fourth brake actuator and a fourth speed sensor operatively associated therewith;

a hydraulic control unit in fluid communication with said master cylinder and said first, second, third and fourth brake actuators, respectively;

a power storage device in communication with the drive motor;

brake control means for commanding said hydraulic control unit in response to said pressure signal and said driven and undriven left and right wheel speed signals; and drive motor control means for determining a coast down regenerative torque signal in response to said acceleration signal and a driver brake command regenerative torque signal in response to said pressure signal and commanding the drive motor to regeneratively brake said driven left and right wheels in response to whichever of said coast down regenerative torque signal and said driver brake command regenerative torque signal is greatest, thereby maintaining a desirable proportioning of front to rear braking.

7. A regenerative and friction braking apparatus according to claim 6, wherein said driver brake command regenerative torque signal is equal to the product of the pressure signal and an empirically determined system constant.

8. A regenerative and friction braking apparatus according to claim 6, wherein said drive motor control means selectively reduces said regenerative braking in response to predetermined system conditions and said brake control means increases said hydraulic braking by said third and fourth hydraulic actuators, so as to maintain said desirable proportioning of front to rear braking.

9. A method of operating a regenerative and friction braking apparatus for a vehicle having one or more wheels driven by a drive motor and a hydraulic control unit in fluid communication with a brake actuator at each of said vehicle wheels, the method comprising the steps of:

generating a hydraulic signal in response to a driver brake command as applied to a master cylinder;

producing a pressure signal representative of said hydraulic signal;

producing an acceleration signal in response to a driver acceleration command;

determining a coast down regenerative torque signal from said accelerator signal;

determining a driver brake command regenerative torque signal in response to said pressure signal; and commanding the drive motor to regeneratively brake the driven wheel in response to whichever of said coast down regenerative torque signal and said driver brake command regenerative torque signal is greatest, thereby maintaining a desirable proportioning of front to rear braking.

10. A method for operating regenerative and friction braking apparatus according to claim 9, wherein said driver brake command regenerative torque signal is determined by the taking the product of the pressure signal and an empirically determined system constant.

11. A method for operating regenerative and friction braking apparatus according to claim 9, further comprising the steps of:

selectively reducing said regenerative braking in response to predetermined system conditions; and increasing said hydraulic braking by said third hydraulic actuator so as to maintain said desirable proportioning of front to rear braking.

* * * * *